W. J. STRAIGHT.
VEHICLE WHEEL.
APPLICATION FILED DEC. 16, 1908.
983,177.
Patented Jan. 31, 1911.
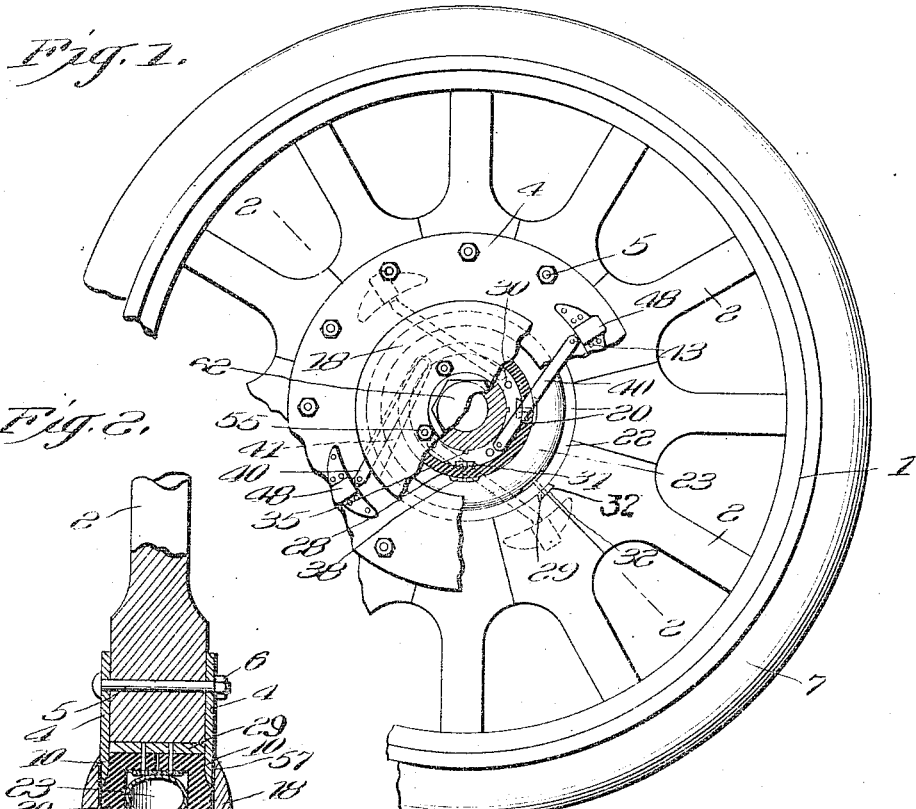
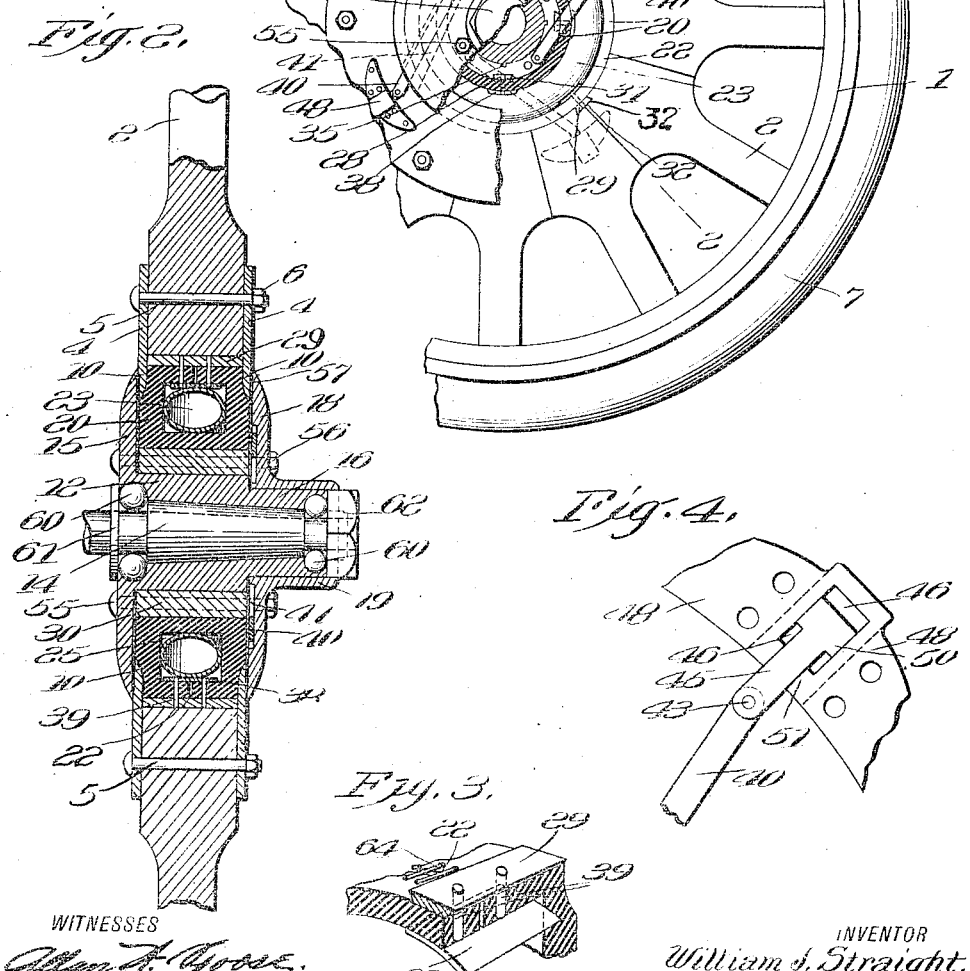
WITNESSES
INVENTOR
William J. Straight.
BY
Alfred Wilkinson
ATTORNEYS

UNITED STATES PATENT OFFICE.

WILLIAM J. STRAIGHT, OF CHICAGO, ILLINOIS.

VEHICLE-WHEEL.

983,177.     Specification of Letters Patent.     Patented Jan. 31, 1911.

Application filed December 16, 1908. Serial No. 467,765.

*To all whom it may concern:*

Be it known that I, WILLIAM J. STRAIGHT, a citizen of the United States, residing at Chicago, in the county of Cook and State of Illinois, have invented new and useful Improvements in Vehicle-Wheels, of which the following is a specification.

This invention relates to wheels for vehicles, consisting of an improvement of the type of wheels generally known as "elastic" or "spring" wheels in which the hub member and the tread or outer member of the wheel are arranged independently to permit a movement relative to each other in a vertical plane and being provided with a resilient element interposed between said members to absorb the shocks and vibrations to which the outer or tread member is subjected. The object of this arrangement being to substitute in place of the pneumatic tire treads commonly employed a pneumatic resilient device suitably inclosed so as to be free from the wear and liability of puncture to which the ordinary tire tread is subject.

The object of the present invention is to produce a wheel adapted successfully to meet the requirements of a wheel of this character which will be comparatively simple in construction, strong and durable, with little possibility of the parts becoming disarranged, and adapted to permit the greatest possible resiliency.

To this end I construct my wheel as shown in the accompanying drawings in which the reference numerals of the description designate corresponding parts in all the figures.

In the drawings Figure 1 is a side elevation showing a wheel employing my invention with portions broken away to illustrate the interior construction thereof. Fig. 2 is an enlarged vertical cross-section view of Fig. 1 on line 2—2. Figs. 3 and 4 are details, Fig. 3 being a partial perspective view showing the wedge-segment and protecting-piece as employed and Fig. 4 a partial view showing the sliding plate and its connecting bar in rear elevation.

In the figures 1 indicates the usual wheel-rim to which the spokes 2 are attached, the spokes as shown being arranged at their inner ends to form a continuous inclosing ring for the hub member and resilient element, and secured in this position by the circular bearing-plates 4—4 oppositely arranged and connected by bolts 5 having securing nuts 6, said bolts being preferably arranged around the wheel as shown with a bolt passing through each of the spokes; the plates, spokes and rim thus forming an integral outer or tread member around which may be arranged a suitable tire or tread for instance a solid rubber tire 7, as shown, suitably arranged on the rim. Within this outer member is arranged the inner or hub member having side flanges arranged to form with the inner flanges 10—10 of the bearing plates 4, an inclosing box for the reception of the resilient element. To this end the hub 12, journaled on the usual axle 14 is provided on one side with the disk flange 15 having its inner face engaging near its periphery with the outer surface of one of the flanges 10, said hub being provided with a reduced bearing end 16 on its opposite end on which is journaled a corresponding disk flange 18 having a horizontal bearing flange 19 fitting the bearing end 16 of the hub.

Surrounding the hub between the two flange disks the resilient member consisting of an outer shoe 20 of hard rubber of circular form is arranged. This shoe is preferably rectangular in cross section and split around its outer periphery as shown at 22, to permit the insertion of an inner pneumatic tube 23 within its interior, the outer shoe having a suitable interior recess 25 therefor.

To prevent the turning of the hub within the resilient element or the outer wheel member thereon which would wear out the shoe eventually and tear out the valve stem, it is desirable that the three parts rotate together. This I accomplish by providing the shoe with wedge pieces on its inner and outer peripheral surfaces adapted to engage the respective hub and outer members. As shown the wedge-pieces 28 arranged on the inner peripheral surface of the shoe and the wedge-pieces 29 on the outer peripheral surface thereof are arranged to extend transversely across the shoe and are fitted to suitable dove-tailed recesses; recesses 31 in the hub-ring 30 and recesses 32 in the outer member being provided for this purpose. It will thus be seen that as the hub-ring is keyed at 35 to the hub, the hub and outer members and the resilient elements are attached to rotate in unison by the employment of the wedge pieces which being dovetailed into the respective members insures against their disengagement, whether the pneumatic tube is fully inflated or not, thus permitting the pressure within said tube to be regulated to suit the conditions under which the wheel is to be used, without danger of disarranging the parts.

As best shown in Fig. 3, to attach the wedge-pieces to the shoe I employ protecting plates 38 adapted to be inserted within the shoe outside the inner-tube and secured to the wedge-pieces by screw-studs 39 passing through the shoe, one on either side of the slot therein, thus securely clamping the shoe between the wedge and plate, the plate then acting as a protector for the inner tube.

It is necessary in wheels of this character that means be provided to relieve the lateral strain produced on the resilient element, particularly when the hub is carried on a driving axle, in that under the construction as far as described the said element is the sole connecting means between the hub and outer members and therefore subject to the entire strain of propelling. I therefore have provided an independent connection between the inner or hub-member and the outer member whereby said members are positively secured together independent of the resilient element, the connection being adapted to permit the necessary vertical movement of the members with relation to one another. As shown this connecting means consists of bars 40 arranged preferably in pairs on either side of the wheel and arranged whereby the connecting bars are proportioned at 45° around the wheel alternately on either side thereof. These bars are arranged within the flange disks 15 and 18 in suitable recesses 41 provided therefor and pivotally secured to the hub ring 30 and extend to a point about one third around the wheel where they are pivotally attached at 43 to the slides 45 sliding in the slide-ways 46 formed in the inner surface of slide-plates 48 secured on the bearing plates 4—4. The slide-bar 45 is provided with shoulders 50 on its inner end to engage the slide-plate shoulders 51 to limit the slide thereof and to prevent its withdrawal.

Bolts 55 passing through the flange disks 15—18 and through the hub ring 30 are provided with securing nuts 56 whereby the disks are clamped in frictional engagement with the bearing plates 4 to resist side pressure of the wheel. Vulcanite plates 57 may be arranged between the bearing-plates and disks to lessen the friction between them and the hub may be journaled to rotate on the usual ball bearings 60 fitting suitable ball-races between the hub and the axle and the hub may be secured thereon between the axle flange 61 and the usual securing nut 62. If desired a lacing 64 may be used as shown in Fig. 3 to lace the shoe together after the insertion of the inner tube to protect the valve stem, not shown.

I have thus produced a resilient wheel in which the pneumatic element is entirely protected and free from lateral strain, the slides 45 attached to the connecting bars for this purpose being arranged to slide in the plates 48 sufficient to permit the resilient vertical movement of the inner and outer members under all but the severest strains, when after the slide has reached the extent of its movement caused by the engagement of the lugs thereon with the plate lugs, further vertical movement will be permitted by the rocking of the connecting bars, also by the construction of wedge-pieces the parts are retained in position under all conditions, permitting the inflation of the resilient element to suit the various conditions under which the wheel is employed whereby the resiliency can be regulated as desired, not depending on the pressure therein to hold any of the parts together.

Having thus described my invention, what I claim and desire to secure by Letters Patent is:—

1. In a vehicle wheel having an inner hub member and an outer traction member surrounding said inner member and adapted to move in relation thereto in a vertical plane, a resilient element interposed between said inner and outer members, said resilient element comprising an outer shoe of elastic material having a circumferential slot therein for the insertion of an inner tube and a recess therefor, an inner pneumatic tube arranged within said recess, wedge-pieces arranged transversely of the inner and outer peripheral surfaces of the shoe and fitted to dove-tailed key-ways in the respective inner and outer members, and protecting plates arranged within the shoe recess outside of the inner tube, said plates and wedge-pieces being connected by studs passing through the shoe whereby the shoe is connected to both the inner and outer members.

2. A wheel for vehicles having an inner hub member and in combination therewith an outer wheel member, bearing plates on the outer member having inwardly extending flanges, vertically extending flange disks on the hub-member in frictional engagement with the said flanges, the disks and flanges forming a circular inclosure for a resilient element between the inner and outer members, a resilient element arranged therein, said element comprising an outer shoe of elastic material having a circumferential slot therein for the insertion of an inner tube and a recess therefor, an inner pneumatic tube arranged in said recess, wedge-pieces arranged transversely of the inner and outer peripheral surfaces of the shoe and fitted to dove-tailed key-ways in the respective inner and outer members, protecting plates arranged within the shoe recess outside of the inner tube, said plates and wedge-pieces being connected by studs passing through the shoe whereby the shoe is connected to both the inner and outer members, slide-way plates arranged on the bearing-plates, slides arranged to slide therein, and connecting bars connected to said slides and to the inner hub-member whereby the hub and outer wheel-members are connected to rotate together.

3. A vehicle wheel having an inner hub-member and an outer traction-member surrounding said inner member and adapted to move in relation thereto in a vertical plane, having in combination a hub having a vertically extending flange-disk on its inner end and a reduced bearing portion on its outer end, a similar flange-disk journaled on said bearing, a hub ring keyed to the hub within the disks, an outer wheel rim having a tire thereon, spokes connected to said rim and radiating thereto, said spokes forming at their inner ends a continuous ring, bearing-plates securing the spokes in place and having inwardly extending flanges therefrom, said flanges being within the flange-disks and in frictional engagement therewith whereby there is formed a circular inclosure for a resilient element between the hub and spoke rings, a resilient element arranged therein, said element comprising an outer shoe of elastic material having a circumferential slot therein for the insertion of an inner tube and a recess therefor, an inner pneumatic tube arranged in said recess, wedge-pieces arranged transversely on the inner and outer peripheral surfaces of the shoe and fitted to dove-tailed key-ways in the respective hub and spoke rings, protecting plates arranged within the shoe recess outside of the inner tube, said plates and wedge-pieces being connected by studs passing through the shoe whereby the shoe is connected to both the hub and spoke rings, slide-way plates arranged alternately on the inner and outer bearing plates and spaced equi-distant, slides arranged to slide therein and connecting bars connecting said slides to the hub ring arranged within the flange-disks, the flange-disks being suitably recessed therefor.

4. In a vehicle wheel having an inner hub member, an outer traction member surrounding the inner member and a resilient element interposed between the said members, said resilient element comprising an outer rubber shoe and an inner pneumatic tube, means to connect the shoe to the outer member, means to connect the shoe to the inner member, said outer member being formed with slide-ways, slides fitted to said slideways, and metallic bars each pivotally connected at its respective ends to the inner member and to a slide, said bars forming direct connections between the inner member and the outer member.

In testimony whereof I have signed my name to this specification in the presence of two subscribing witnesses.

WILLIAM J. STRAIGHT.

Witnesses:
CHARLES C. SPENCER,
EDWARD J. GREEN.